(12) United States Patent
Umlauf et al.

(10) Patent No.: US 7,370,124 B2
(45) Date of Patent: May 6, 2008

(54) METHOD AND DEVICE FOR TRANSMITTING MESSAGES OVER A DATA NETWORK

(75) Inventors: Jens Umlauf, Merching (DE);
 Christian Fertl, Pfaffing (DE);
 Christian Wallis, München (DE);
 Rainer Katterloher, Dorfen (DE);
 Hermann Andresen, Heldenstein (DE);
 Stephan Pilsl, Röhrmoos (DE)

(73) Assignee: Oce Printing Systems GmbH, Poing (DE)

( * ) Notice: Subject to any disclaimer, the term of this patent is extended or adjusted under 35 U.S.C. 154(b) by 35 days.

(21) Appl. No.: 10/529,527

(22) PCT Filed: Oct. 7, 2003

(86) PCT No.: PCT/EP03/11087

§ 371 (c)(1),
(2), (4) Date: Jan. 24, 2006

(87) PCT Pub. No.: WO2004/034272

PCT Pub. Date: Apr. 22, 2004

(65) Prior Publication Data

US 2006/0155820 A1 Jul. 13, 2006

(30) Foreign Application Priority Data

Oct. 7, 2002 (DE) ................. 102 46 732

(51) Int. Cl.
*G06F 3/00* (2006.01)

(52) U.S. Cl. .......................... 710/38; 709/238
(58) Field of Classification Search ........... 710/310, 710/316–317, 313, 2, 38; 713/400; 709/238
See application file for complete search history.

(56) References Cited

U.S. PATENT DOCUMENTS

| 3,614,745 | A | | 10/1971 | Podvin |
| 4,737,907 | A | | 4/1988 | Federico et al. |
| 5,313,620 | A | | 5/1994 | Cohen et al. |
| 5,634,015 | A | * | 5/1997 | Chang et al. ............... 710/310 |
| 5,774,638 | A | | 6/1998 | Kageyama et al. |
| 6,131,809 | A | | 10/2000 | Drescher et al. |
| 6,434,656 | B1 | | 8/2002 | Downer et al. |
| 2002/0111696 | A1 | | 8/2002 | Albrecht et al. |

FOREIGN PATENT DOCUMENTS

| DE | 42 26 052 | 2/1993 |
| DE | 198 22 146 | 12/1998 |
| DE | 199 20 992 | 11/2000 |
| DE | 199 28 930 | 12/2000 |
| DE | 100 59 270 | 6/2002 |

* cited by examiner

*Primary Examiner*—Clifford Knoll
(74) *Attorney, Agent, or Firm*—Schiff Hardin LLP

(57) ABSTRACT

In a method and system for transmitting messages over a data network, the communication task is used which is implemented on a transmitting microcontroller which determines, on the basis of a routing table, which communication system is used to forward the message to which adjacent microcontroller. A dual-ported RAM is provided between two microcontrollers as one type of communication system.

11 Claims, 5 Drawing Sheets

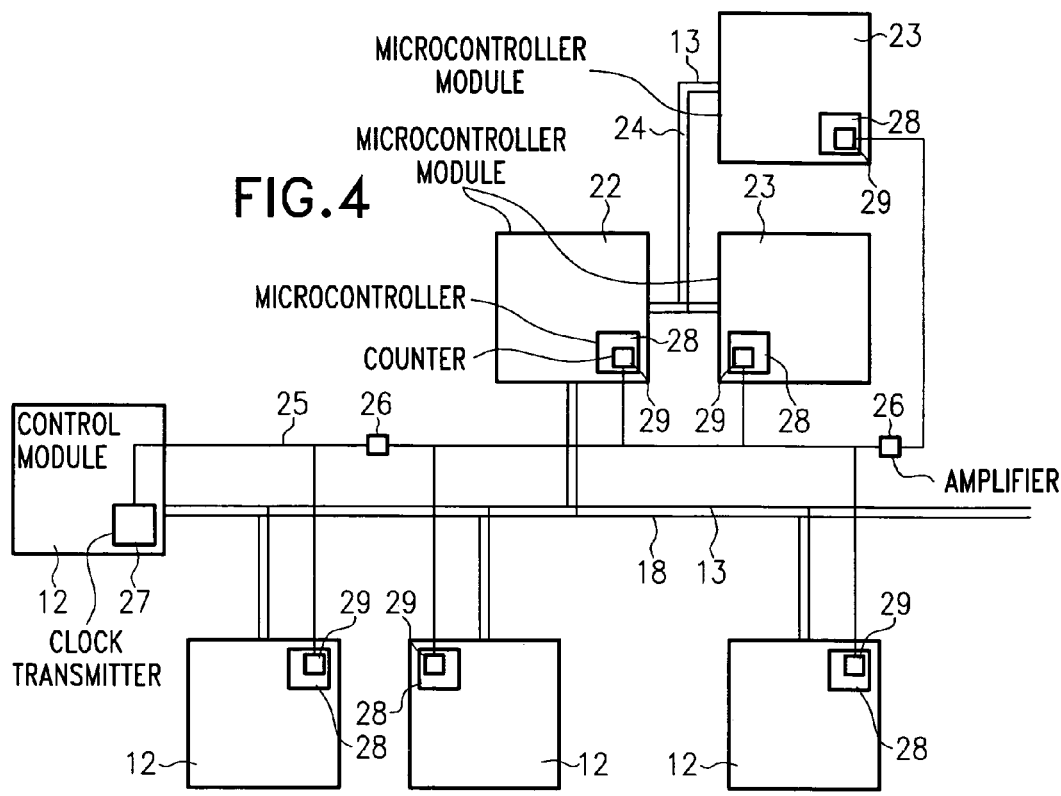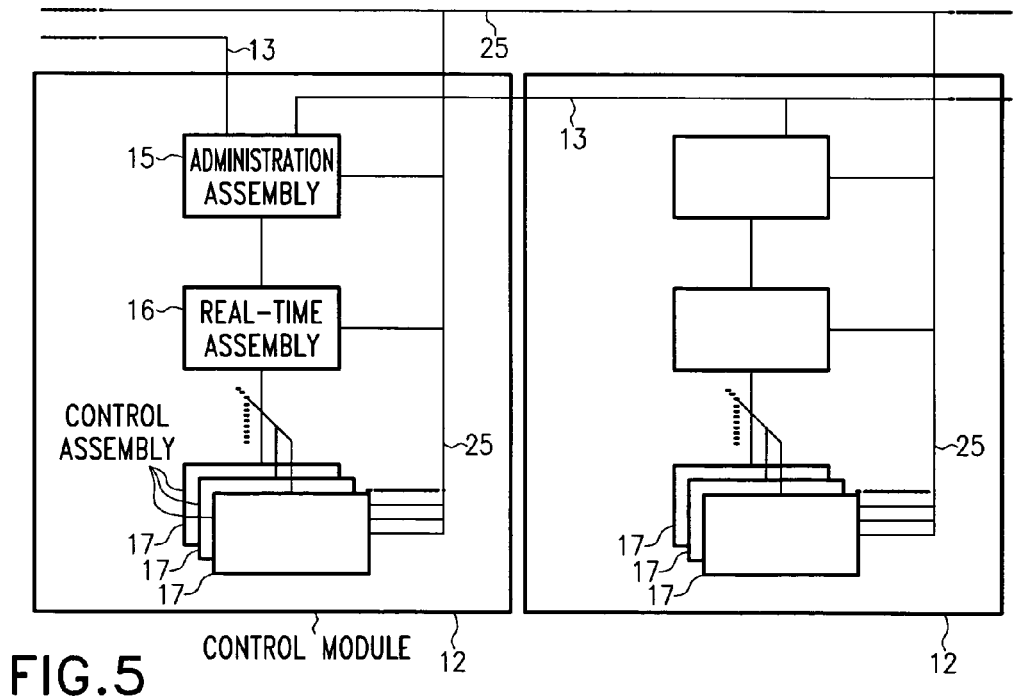

| | | | | | |
|---|---|---|---|---|---|
| PI VW | 1 | PI1 SM PCB3 SAT3 | 20 | PI2 SM PCB2 SAT2 | 39 |
| PI RT | 2 | PI1 SM PCB1 BM | 21 | PI2 SM PCB2 SAT3 | 40 |
| PI1 VW | 3 | PI1 SM PCB1 SAT1 | 22 | PI2 SM PCB3 BM | 41 |
| PI1 RT | 4 | PI1 SM PCB1 SAT2 | 23 | PI2 SM PCB3 SAT1 | 42 |
| PI2 VW | 5 | PI1 SM PCB1 SAT3 | 24 | PI2 SM PCB3 SAT2 | 43 |
| PI2 RT | 6 | PI1 SM PCB2 BM | 25 | PI2 SM PCB3 SAT3 | 44 |
| PI3 VW | 7 | PI1 SM PCB2 SAT1 | 26 | PI3 SM PCB1 BM | 45 |
| PI3 RT | 8 | PI1 SM PCB2 SAT2 | 27 | PI3 SM PCB1 SAT1 | 46 |
| PI SM PCB1 BM | 9 | PI1 SM PCB2 SAT3 | 28 | PI3 SM PCB1 SAT2 | 47 |
| PI SM PCB1 SAT1 | 10 | PI1 SM PCB3 BM | 29 | PI3 SM PCB1 SAT3 | 48 |
| PI SM PCB1 SAT2 | 11 | PI1 SM PCB3 SAT1 | 30 | PI3 SM PCB2 BM | 49 |
| PI SM PCB1 SAT3 | 12 | PI1 SM PCB3 SAT2 | 31 | PI3 SM PCB2 SAT1 | 50 |
| PI SM PCB2 BM | 13 | PI1 SM PCB3 SAT3 | 32 | PI3 SM PCB2 SAT2 | 51 |
| PI SM PCB2 SAT1 | 14 | PI2 SM PCB1 BM | 33 | PI3 SM PCB2 SAT3 | 52 |
| PI SM PCB2 SAT2 | 15 | PI2 SM PCB1 SAT1 | 34 | PI3 SM PCB3 BM | 53 |
| PI SM PCB3 BM | 16 | PI2 SM PCB1 SAT2 | 35 | PI3 SM PCB3 SAT1 | 54 |
| PI SM PCB3 SAT1 | 17 | PI2 SM PCB1 SAT3 | 36 | PI3 SM PCB3 SAT2 | 55 |
| PI SM PCB3 SAT2 | 18 | PI2 SM PCB2 BM | 37 | PI3 SM PCB3 SAT3 | 56 |
| PI SM PCB3 SAT3 | 19 | PI2 SM PCB2 SAT1 | 38 | | |

FIG.6

| Sender \ endg. Empfänger | cs_noexist_proc | PI_VW | PI_RT | PI1_VW | PI1_RT |
|---|---|---|---|---|---|
| /*cs_noexist_proc*/ | { 0 , 0 }, | { 0 , 0 }, | { 0 , 0 }, | { 0 , 0 }, | { 0 , 0 }, |
| /* PI_VW */ | { 0 , 0 }, | {B_MSG, 0 }, | {B_DPR, PI_RT}, | {B_CAN, PI1_VW }, | {B_CAN, PI1_VW }, |
| /* PI_RT */ | { 0 , 0 }, | {B_DPR, PI_VW}, | {B_MSG, 0 }, | {B_DPR, PI_VW}, | {B_DPR, PI_VW}, |
| /* PI1_VW */ | { 0 , 0 }, | {B_CAN, PI_VW }, | {B_CAN, PI_VW }, | {B_MSG, 0 }, | {B_DPR, PI1_RT }, |
| /* PI1_RT */ | { 0 , 0 }, | {B_DPR, PI1_VW }, | {B_DPR, PI1_VW }, | {B_DPR, PI1_VW }, | {B_MSG, 0 }, |
| /* PI2_VW */ | { 0 , 0 }, | {B_CAN, PI_VW }, | {B_CAN, PI_VW }, | {B_DPR, PI2_VW }, | {B_CAN, PI1_VW ), |
| /* PI2_RT */ | { 0 , 0 }, | {B_DPR, PI2_VW }, | {B_DPR, PI2_VW }, | {B_DPR, PI2_VW }, | {B_DPR, PI2_VW }, |
| /* PI3_VW */ | { 0 , 0 }, | {B_CAN, PI_VW }, | {B_CAN, PI_VW }, | {B_CAN, PI1_VW }, | {B_CAN, PI1_VW }, |
| /* PI3_RT */ | { 0 , 0 }, | {B_DPR, PI3_VW }, | {B_DPR, PI3_VW }, | {B_DPR, PI3_VW }, | {B_DPR, PI3_VW }, |
| /* PI_SM_PCB1_BM */ | { 0 , 0 }, | {B_CAN, PI_RT }, | {B_CAN, PI_RT }, | {B_CAN, PI_RT }, | {B_CAN, PI_RT }, |
| /*PI_SM_PCB1_SAT1*/ | { 0 , 0 }, | {B_CAN, PI_RT }, | {B_CAN, PI_RT }, | {B_CAN, PI_RT }, | {B_CAN, PI_RT }, |

FIG.7

METHOD AND DEVICE FOR TRANSMITTING MESSAGES OVER A DATA NETWORK

BACKGROUND

Local data networks with a plurality of microcontrollers are often provided in machines such as, for example, printers or copiers in which the individual modules of the machines are respectively controlled by one or more microcontrollers and the microcontrollers communicate with all modules over such a data network. These data networks are often based on the CAN bus. The CAN bus or the corresponding protocol is explained in detail in CAN Controller Error Network, Grundlage und Praxis, 2nd edition, 1997 (ISBN 3-7785-2575-1). A CAN bus is a serial data bus that is typically realized with a differential two-wire line. The messages are transferred in what are known as CAN telegrams or CAN frames. Such a CAN data telegram comprises a start bit, an identifier comprising 11 bits, a further seven control bits, 0-8 data bytes and further control bits that follow the data bytes. The design of a CAN data telegram can differ depending on the specification; there is thus a CAN specification 2.0A and a CAN specification 2.0B. The arbitration is executed per bit and without control. This means that the transmitter that prevails (based on its priority) in the data bus relative to other transmitters does not have to resend its telegram. The control bits provides by the data bytes are used for arbitration, whereby the arbitration essentially occurs via the bits of the identifier.

A further development of the CAN bus is designated as a PeliCAN that is equipped with further service features relative to the conventional CAN bus. A stand-alone CAN controller with the designation SJA 1000, which completely supports the CAN 2.0B protocol and additionally can be operated in the PeliCAN mode, is offered by the firm Philips. This controller is described in detail in the datasheet of 4 Jan. 2000.

A machine controlled by a plurality of processors emerges from U.S. Pat. No. 4,737,907, whereby one of the processors is a master processor and the further processors are activated by the master processor in order to execute specific actions. Clock signals that are supplied to all processors are generated by means of a breaker plate. The master processor can therefore send a command to a further processor and combine this command with a delay time, such that these further microcontrollers only execute the command after the expiration of the delay time. The delay time is specified in a specific number of clock pulses. Via the use of the clock pulses, the master processor does not always have to output to the further microcontrollers its respective commands for execution of the actions at the point in time at which the commands should be executed, but rather can send out the respective commands early and tend to other actions after sending the commands. The master processor is thus unloaded.

If the communication between the master processor and the further processors were to be executed over a data network in which the delays for transfer of messages can vary and in particular depend on the load of the data network, the individual actions cannot be executed at an exact predetermined point in time, since this point in time would be affected by the transfer time of the individual messages.

A hardware circuit in which various processing components can communicate with one another is shown in U.S. Pat. No. 3,614,745.

A local network for the control of a plurality of processors and control cards at a printing machine emerges from DE 100 59 270 A1. The individual processes on the control cards are synchronized with the aid of a centrally-generated system tract that is transferred to the individual control cards over a free line. The individual actions are initiated by the control cards, dependent on an angle setting of the machine, whereby a specific angle setting, the rotation speed, and the acceleration at a specific point in time from which other angle settings are then extrapolated, are transferred to the control cards.

A multiprocessor system in which a plurality of autonomous processes use the same address range of a storage emerges from U.S. Pat. No. 5,313,620.

DE 198 22 146 A1 specifies a device for communication between a plurality of electrical components such as, for example, sensors, actuators or gauges. This device comprises a master and a number of slaves, corresponding to the number of the electrical components that are connected with one another via a bidirectional interface. The master generates the synchronization pulses, clock signals and transmission pulses, whereby a synchronization pulse respectively initiates a cycle in which a specific number of clock signals are switched on the bidirectional interface.

A method with which two processors can access a common storage device that is a dual-ported RAM, whereby no arbitration logic is necessary, emerges from DE 199 20 992 A1. For this, an item of information stored in the dual-ported RAM is read out n times and subsequently compared. If the n determined items of information are identical, the read information is correct. Otherwise the read event must be repeated.

A routing device for coupling of various telecommunication networks with different protocols and different transfer properties emerges from DE 199 28 930 A1. With this device, narrow-band military special networks should in particular be coupled to broadband civil networks and/or other narrow-band military special networks. Routers allow networks with different network protocols to connect. Using the address of a data packet, routers determine which router or which workstation should receive the packet next. Based on a routing table, routers ensure that the packets reach their goal in the most efficient way possible. When a connection between two routers is disturbed, the transmitting router can determine an alternative path in order to sustain the traffic flow.

SUMMARY

It is an object to achieve a method to transmit messages in a local data network comprising a plurality of microcontrollers, whereby the data network is comprised of network segments that are based on different transfer protocols.

In a method and system for transmitting messages over a data network, the communication task is used which is implemented on a transmitting microcontroller which determines, on the basis of a routing table, which communication system is used to forward the message to which adjacent microcontroller. A dual-ported RAM is provided between two microcontrollers as one type of communication system.

BRIEF DESCRIPTION OF THE DRAWINGS

FIG. 4 is a control device with a plurality of microcontroller modules;

FIG. 5 shows a section of the control device from FIG. 4 with two control modules according to FIG. 2;

FIG. 6 illustrates a table in which are entered the ID numbers of individual microcontrollers of a control device for a printer; and FIG. 7 is a routing table.

DESCRIPTION OF THE PREFERRED EMBODIMENT

Figure 1:
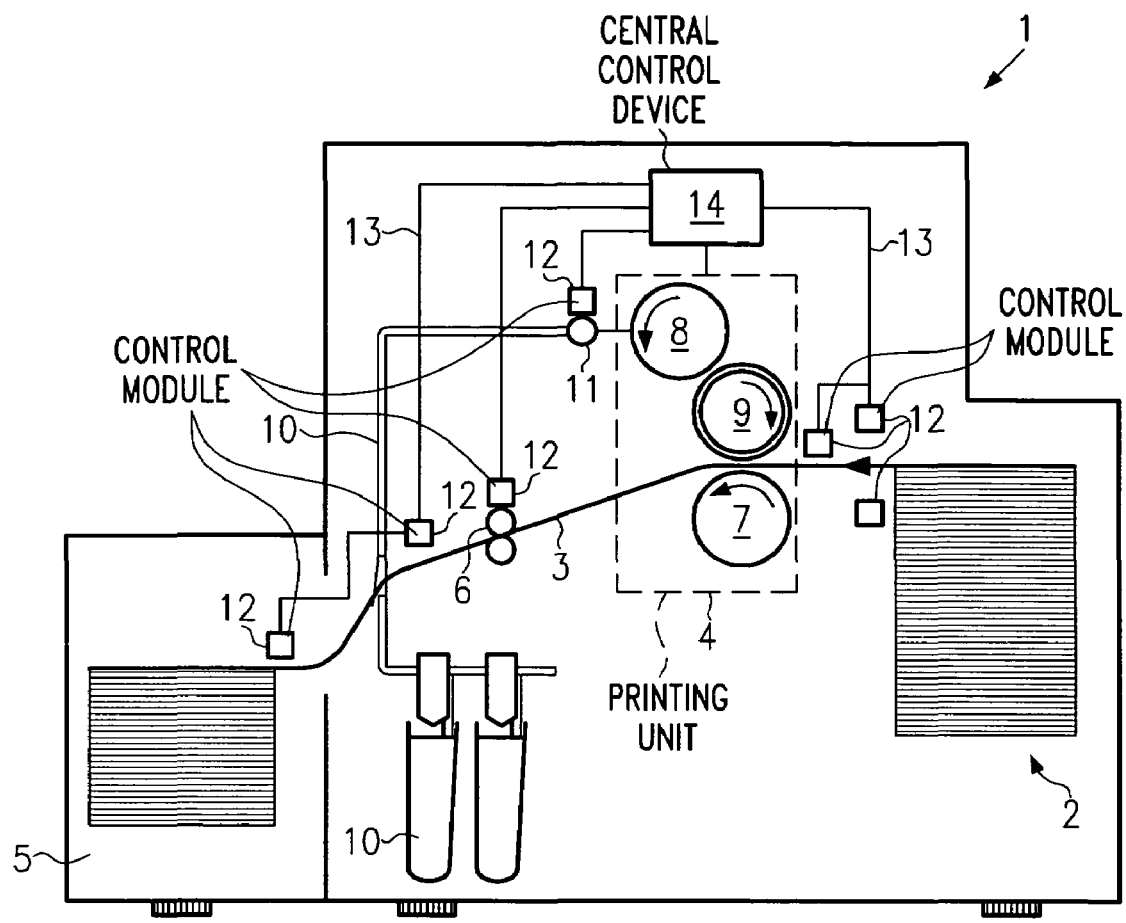
FIG. 1 shows a single-sheet printer with a control device in which the method of the preferred embodiment is applied.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

In the method of the preferred embodiment, a communication task that accesses a routing table is provided to each microcontroller. In the routing table it is specified, dependent on the microcontroller to which a message should be transmitted, to which adjacent microcontroller it is to be forwarded, such that this adjacent microcontroller can (likewise with a corresponding communication task) forward the message to a further adjacent microcontroller by means of a corresponding routing table until it reaches the ultimate receiver.

Since, according to the preferred embodiment, at least one dual-ported RAM is arranged as a communication system between two of the microcontrollers of the data network, on the one hand a larger quantity of data can be very rapidly exchanged between these two microcontrollers, and on the other hand, in the exchange of the data, these are buffered, such that a time-delayed reading of the data is also possible.

The combination, comprised of the dual-ported RAM and the provision of communication tasks that transfer messages by means of a routing table, achieves a simple, flexible and nevertheless fast data network that is particularly suitable for control of devices such as, for example, printers.

In the development according to FIG. 4, clock signals are transmitted to all microcontrollers connected with the data network via a clock line designed parallel to the data network, whereby the microcontrollers respectively comprise counters with which they count the clock rate and the counters are synchronized such that respectively the same clock values are counted in all counters of the microcontrollers. These counters thus represent exactly synchronized clocks, and control commands are provided with an execution time in the form of a counter value such that they are executed at an exact specific time.

The execution of specific actions at specific points in time is thus independent of the transit time that the commands require over the data network.

The preferred embodiment is in particular provided for application in a printing or copying device.

The method of the preferred embodiment for transmission of messages over such a data network is used in a control device of a single-sheet printer 1 (FIG. 1). The single-sheet printer 1 comprises a paper input tray 2 and a device (not shown) to isolate the paper sheets stacked therein. The paper sheets are conveyed along a transport path 3 from the paper input tray 2 to a printing unit 4 and an output shaft 5.

The transport path is formed by a plurality of roller pairs 6 (for simplification of the representation, only a single pair is shown in FIG. 1) and corresponding guidance devices. The printing unit 4 comprises two printing rollers 7 and an ink application roller 8. In electrographically-operating printing units 4, the ink application roller 8 is exposed by means of an illumination unit (not shown) such that it accepts ink particles at the exposed/non-exposed locations. The ink particles are supplied by a corresponding reservoir 9 via a feed line 10 and a controllable valve 11 of the ink application roller 8.

The printer 1 comprises a control device that is comprised of a plurality of control modules 12 to control the paper input tray 2, the transport path 3, the printing unit 4, the output tray 5, etc. These control modules 12 are connected with one another and with a central control device 14 over a data network 13.

Figure 2:
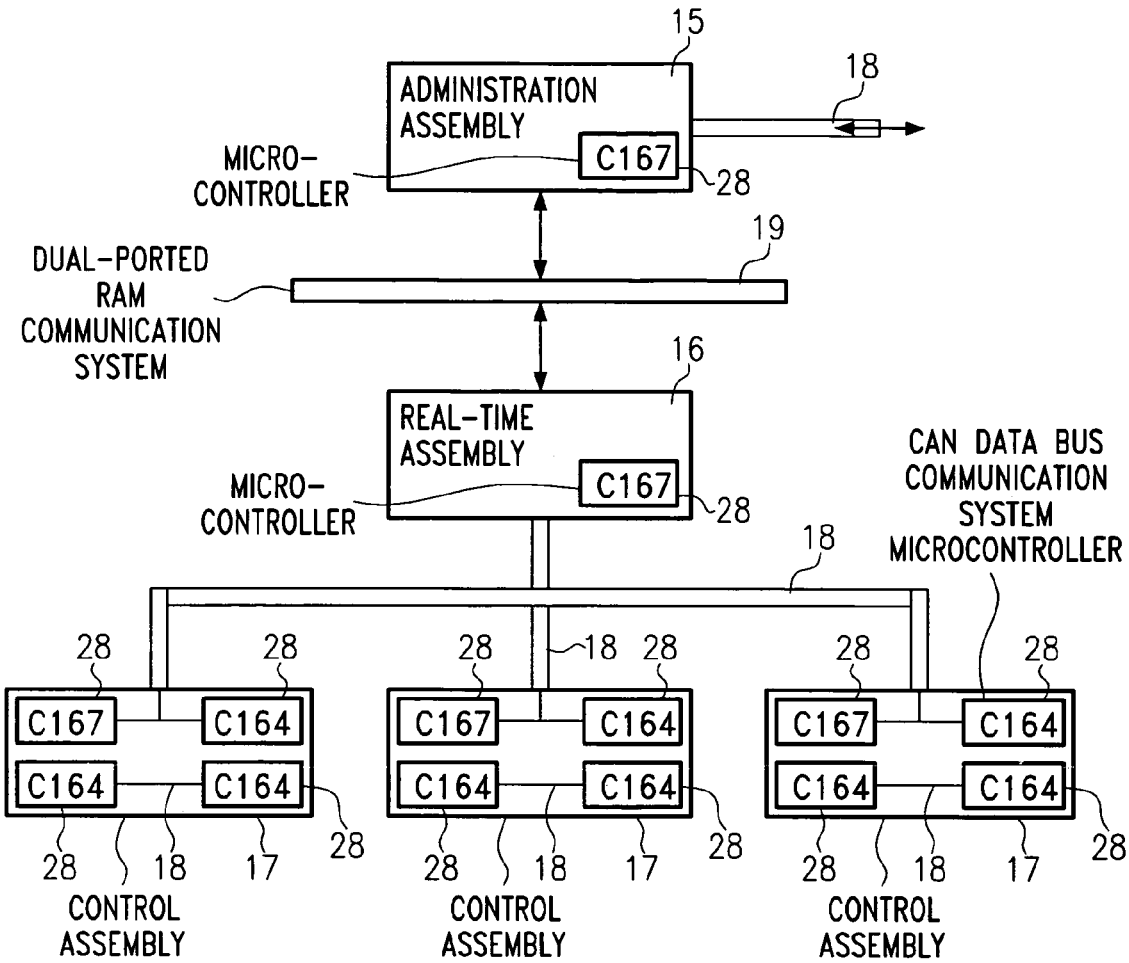
FIG. 2 shows a control module in a block diagram.

A typical control module 12 is schematically shown in FIG. 2. It comprises five microcontroller or processor assemblies, namely an administration assembly 15, a real-time assembly 16 and three control assemblies 17. The control assemblies 17 respectively possess four microcontrollers or processors 28 that are connected with one another via a CAN data bus 18 within the assembly 17. One of the four microcontrollers 28 of the control assembly 17 forms a boot master and the three further microcontrollers 28 form the satellites; and upon the boot event, the satellites are subordinate to the boot master. The boot master is typically a C167 microcontroller by Infineon. The further microcontrollers are typically C164 microcontrollers by Infineon. The control assemblies 17 are connected among one another and with the real-time assembly 16 over the CAN bus 18 type of communication system. The real-time assembly 16 comprises a single microcontroller 28 that is typically a C167 microcontroller by Infineon.

Figure 3:
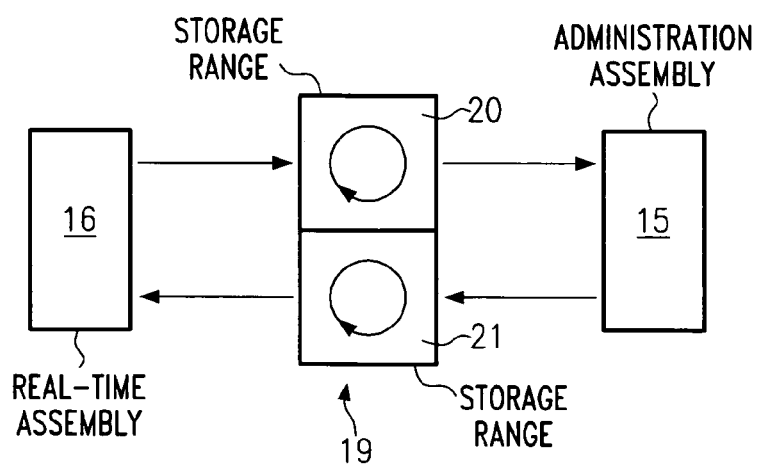
FIG. 3 illustrates schematically the functionality of a dual-ported RAM contained in the control module from FIG. 2.

The real-time assembly 16 is connected with the administration assembly 15 via a dual-ported RAM 19 type of communication system. The dual-ported RAM is a storage component that can be read and written both by the real-time assembly 16 and by the administration assembly 15. Both of these assemblies 15, 16 can thus exchange data, in that they store their data in the dual-ported RAM 19 and read the data stored by the other assembly. On the one hand, such a dual-ported RAM 19 allows a very rapid exchange of larger quantities of data, and on the other hand, given exchange of the data these are buffered, such that a time-delayed reading of the data is also possible without the data thus being lost. The dual-ported RAM 19 is partitioned into two equally-large storage regions 20, 21 (FIG. 3). These storage regions 20, 21 are respectively used as a ring buffer for communication from the real-time assembly 16 to the administration assembly 15 or for communication from the administration assembly 15 to the real-time assembly 16. Such a ring storage buffer is sub-divided into a data block of 266 bytes, whereby 10 bytes are a header for administration of the data blocks and 256 bytes are used as a data byte. Each ring storage buffer comprises 2000 such data blocks that are written and read according to the FIFO principle.

The administration assembly 15 possesses a connection to the CAN bus 18 via which a plurality of control modules 12 can be connected with further control modules or a further data network based on the CAN bus.

FIG. 4 schematically shows the design of an embodiment of a control device of the preferred embodiment for a printer. This control device is modularly designed from a plurality of microcontroller modules that are connected with one another via one or more data networks. In the embodiment according to FIG. 4, four microcontroller modules are provided that are designed according to the control module 12 shown in FIG. 2. These control modules 12 are connected with one another over the CAN data bus 12 for exchange of messages. A further microcontroller module 22 that possesses a different design than the remaining control modules 12 is connected to this CAN data bus 18. Further microcontroller modules 23 are connected to the microcontroller module 22 via a data bus 24. The data bus 24 can be a CAN data bus. However, it is possible to use another data bus type.

In addition to the data network, a clock line 25 is provided that is routed to all microcontroller assemblies 12, 22, 23 and there branched to each individual microcontroller or processor (FIG. 5). Amplifiers 26 that amplify the signal present in the clock line are arranged in the clock line at predetermined intervals.

One of the control modules 12 represents the clock master, i.e. its clock transmitter 27 is used to feed a clock signal to the clock line 25. In the control device shown in FIG. 4, the clock master is the control module 12 arranged at the left end of the data network. Each microcontroller possesses a counter with a count register. Upon powering up the control device, the communication between all microcontroller modules 12, 22 and 23 and between all of their microcontrollers or processors is initially established over the data network 13. The count register of all microcontrollers is subsequently initialized, i.e. set to 0, which is normally zero. All microcontrollers then notify the clock master that their counters are initialized. In the control modules 12, this message is executed by the administration assembly 15. Only after this does the clock master begin to feed the clock signal into the clock line 25. All microcontrollers count the number of the clock pulses received from the clock line 25 with their respective counter connected with the clock line. Since all counters have begun to count simultaneously with the same count value, they are exactly synchronized and possess an exactly-synchronized time signal. It is appropriate to re-synchronize the counters at regular intervals so that problems (due to the overflow of the counters or the like) are avoided. For this, the clock signal is deactivated, all counters are set to a predetermined value (preferably to 0), and the clock signal is newly fed into the clock line as soon as all counters are set to the same value. A typical clock rate for such a clock signal is, for example, 100 KHz. The counters are typically 32-bit counters. In principle, it is also possible to use 16-bit counters, or counters with a larger register.

Via the use of the clock signal, it is possible to execute real-time applications on a control device whose microcontroller or control modules are connected with a simple, cost-effective data bus such as, for example, the CAN data bus on which no exact transfer time of the individual messages can be ensured. The CAN data bus is a simple, serial data bus with differential two-wire line.

In the control device of the preferred embodiment, control commands are generated by the central control device 14, which is represented by one of the microcontroller modules in the data network 13, and are transmitted to the corresponding microcontroller via the data network 13. These messages or control commands can be provided with a time specification in the form of a counter state. The corresponding microcontroller stores this time specification in a comparison register. The corresponding command is executed as soon as the counter state is entered into the count register at this microcontroller.

For example, in the control of the transport of paper sheets it is necessary that a plurality of roller pairs are activated at exact predetermined points in time and that their rotation speed is synchronously increased. Respectively one microcontroller is provided for each motor to drive a roller pair. The individual roller pairs can thus be activated individually but with temporally exact synchronization.

The synchronous counter state of the individual counter can also be used as a time signal for specific, temporally critical information. Such information is, for example, sensor data that are generated by sensors coupled to a microcontroller or microcontrollers, error messages that are generated by the respective microcontroller or trace data that describe the status of the individual elements of the printing device. This corresponding information, such as sensor data, error messages or trace entries, are provided with the current time signal (which is designated as a time stamp) at the point in time of their creation. The point in time of the creation of the message can thus be established given forwarding of these messages over the data network 13 for the further microcontroller modules, in particular the central control device 14. Thus, given analysis of processes, the temporal sequence of the individual processes can be exactly reconstructed.

In such complex control tasks, as in a printer, the problem increasingly occurs that there are inherently suitable partial solutions for specific partial tasks that are based on a system controlled by a microcontroller, however that is not compatible with the present data network and therefore can only be integrated with a great deal of effort. Additionally, it is often desirable to design individual sections of a data network made of different data buses or data transmission systems such as, for example, in the control module 12 described above, in which both the CAN bus 18 and the dual-ported RAM 19 are used in sections for the transfer of data.

In the control device described above, this problem is solved in that a communication task that controls the communication with the further microcontrollers is present on each microcontroller 28. This problem is thus solved on the task level as software.

For this, a specific identification (ID) is associated with each microcontroller 28 of the data network 13. For example, in the printer 1 the identification is assembled from the following elements: "range", "unit", "assembly" and "microcontroller", whereby the following nomenclature is used:

| Range: | |
|---|---|
| PI = | paper input |
| PU = | print unit |
| PO = | paper output |
| Unit: | |
| _ = | clock master |
| X_ = | x is the number of one of the further control modules |
| Assembly: | |
| VW = | administration assembly |
| RT = | real-time assembly |
| SM_PCBx = | control assembly with the number x |

-continued

Microcontroller:

The microcontroller only has to be specified when an assembly has more than one microcontroller.
_BM = boot master
_SATx = satellite nr.X A table with the identifications of the microcontrollers of four control modules 12 for a paper input is specified in FIG. 6, whereby one control module assumes the task of the clock master and the three further control modules 12 synchronize their counters according to the clock signal of the clock master.

These four control modules 12 in total comprise 56 microcontrollers that can be unambiguously identified by means of the nomenclature above.

A routing table is contained in each communication task, with the help of which the transmission of the data messages over the network is executed.

FIG. 7 shows a section of this routing table for the microcontroller of the paper input, according to the table from FIG. 6. This table is a 57×57 matrix, whereby the columns are respectively associated with one receiver microcontroller and the rows are respectively associated with a transmitting microcontroller. The identifications of the transmitting microcontroller are therefore stated in the left column; and the identifications of the receiving microcontrollers are stated in the uppermost row. The receiving mail carriers are thus the microcontroller that should ultimately receive the corresponding message. Additionally, the virtual microcontroller name "cs_noexist_proc" is listed with which all wrong identifications in the message transfer are associated. A value pair is specified in curved brackets at each location in the matrix itself. The first value of each bracket contains an expression for the type of the communication system to be used for transfer, such as, for example, B_CAN for the CAN bus type of communication system or B_DPR for the dual-ported RAM type of communication system. The second value of this value pair contains the identification of the respectively adjacent microcontroller to which the message must be forwarded so that it can arrive at the receiver microcontroller.

If, for example, the communication task of the microcontroller PE_SM_PCB1_BN (i.e. the boot master of the first control assembly 17 of the clock master) receives the command to send a message to the administration assembly 15 of the clock master, using the routing table the communication task recognizes that the message is to be forwarded to the real-time assembly 16 (PI_RT) of the clock master via the CAN bus (B_CAN). At the real-time assembly 16, the corresponding microcontroller reads out the final receiver of the data message (PI_VW) and, using the routing table, recognizes that the data message is to be forwarded to the administration assembly PI_VW of the clock master via the dual-ported RAM (B_DPR). To transfer the message, the communication tasks of the individual assemblies resort back to the commands of the respective operating system, in which commands for forwarding of the information by means of the corresponding communication system are contained. In the event that no corresponding commands are present in the operating system, corresponding drivers must be used.

Upon receipt of a message by the communication task, it is thus initially checked which microcontroller is the ultimate receiver of the message, and then by means of the routing table it is determined to which adjacent microcontroller the message must be forwarded via which communication system. Using these data, the message is then forwarded to the suitable adjacent microcontroller. This is executed repeatedly with the message until the message has arrived at the final receiver.

Via the provision of the routing table, a solution is thus achieved on the task level that messages are transmitted via data networks that are made up of different transmission systems per section. In the operating systems of the individual microcontrollers, only the communication commands to communicate with the adjacent microcontrollers must be implemented, which is typically the case.

In principle, it is not necessary that the complete routing table is contained in all communication tasks. Each task should contain at least the row of the table whose transmitter microcontroller is the respective microcontroller of the communication task.

The method specified above for transfer of data messages in a data network by means of communication tasks and routing tables can be applied on any data bus, and can also be executed independent of the system with the clock line described above. However, in combination with the clock line it allows the use of an inhomogeneous data network as a control device, whereby at the same time the real-time capability of the entire control device is ensured.

The preferred embodiment can be briefly summarized according to the following:

The preferred embodiment concerns a method for synchronization of actions that are controlled over a local data network comprising a plurality of microcontrollers and a method for transmission of messages over such a data network.

The individual microcontrollers of the data network comprise counters that are synchronized via a common clock signal. Using the counter values, all individual microcontrollers can be executed at an exact determined point in time.

The preferred embodiment method for transmission of messages over the data network comprises a communication task that is implemented on each microcontroller and that establishes, using a routing table, with which communication system it has to forward the message to which adjacent microcontroller. The communication task can be unloaded via further tasks that, for example, take up the pre-processing of the messages.

The combination of both of the methods allows the use of an inhomogeneous data network for execution of control tasks in real time.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

We claim:

1. A method for transmission of messages, comprising the steps of:
providing a plurality of microcontrollers comprising at least first and second microcontrollers connected by a data network comprising a communication system having at least one synchronized CAN bus and at least one dual-ported RAM which provides both rapid exchange of data and a buffered exchange of data;

providing first and second transfer microcontrollers directly communicating with each other through said dual-ported RAM;

providing an operating system on each of the microcontrollers;

for a given communication task for sending a message, providing the first or second microcontroller serving as a transmitting microcontroller a routing table in which is stored routing information for executing said given communication task, said routing information comprising a list of the first or second transfer microcontroller which is adjacent the transmitting microcontroller and which is suitable for transfer of the message to said second microcontroller serving as a receiving microcontroller and a corresponding type of the communication system to be used for the transfer of the message between the transmitting microcontroller and the respective adjacent first or second transfer microcontroller;

for transmission of said message to said receiving microcontroller, reading from the routing table the respective adjacent first or second transfer microcontroller and said corresponding type of said communication system; and transmitting the message to the adjacent first or second transfer microcontroller which transmits the message using the dual-ported RAM to said receiving microcontroller.

2. A method according to claim 1 wherein the data network is inhomogeneous and in which data are transferred with different protocols per segment.

3. A method according to claim 1 wherein the dual-ported RAM is divided into two storage regions which are used as a ring buffer for communication between the respective adjacent first or second transfer microcontroller and the transmitting microcontroller.

4. A method according to claim 1 wherein actions are controlled in synchronization across the data network;

each microcontroller comprises a counter with a count register and all counters are synchronized at least upon powering up the data network, and wherein the counters are set to a predetermined initial value;

after the initialization a uniform clock signal is sent to all microcontrollers by a clock line consistent for all microcontrollers;

the counters of the microcontrollers counting the clock pulses of the clock signal; and actions are initiated by control commands that are transferred over the data network and that contain a time signal in the form of a number value such that the control command is executed upon the corresponding microcontroller reaching said number value.

5. A method according to claim 4 wherein all microcontrollers of the data network are synchronized in regular intervals at which the clock signal is interrupted, all counters of the microcontroller are uniformly set to a predetermined value, and the clock signal is again set to all microcontrollers.

6. A method according to claim 4 wherein a serial network transferring the data, based on a two-wire line, is used as in the data network.

7. A method according to claim 4 wherein a clock signal is generated with a clock rate of 50/200 khz.

8. A method according to claim 4 wherein temporally-critical information are provided with a current value of the count register of one of the counters at a point-in-time of their creation.

9. A method according to claim 8 wherein the temporally-critical information comprises at least one of the elements selected from the group consisting of sensor data error messages and trace data.

10. A system for transmission of messages, comprising:

a data network over which the transmission of the messages occurs and wherein a plurality of microcontrollers are connected to one another by the data network, said data network comprising a communication system;

at least first and second of said plurality of microcontrollers connected by the communication system, said communication system comprising at least one dual-ported RAM which provides both rapid exchange of data and a buffered exchange of data;

first and second transfer microcontrollers directly communicating with each other through said dual-ported RAM;

an operating system on each of the plurality of microcontrollers; and for a given communication task for sending a message, providing the first or second microcontroller serving as a transmitting microcontroller a routing table in which is stored routing information for executing said given communication task, said routing information comprising a list of the first or second transfer microcontroller which is adjacent the transmitting microcontroller and which is suitable for transfer of the message to said second microcontroller serving as a receiving microcontroller and a corresponding type of the communication system to be used for the transfer of the message between the transmitting microcontroller and the respective adjacent first or second transfer microcontroller.

11. A system of claim 10 wherein the first transfer microcontroller comprises an administration assembly and the second transfer microcontroller comprises a real-time assembly both connected with said dual-ported RAM, and wherein said first and second microcontrollers are each part of a respective control assembly that comprises a plurality of microcontrollers, and wherein the microcontrollers of the control assembly are connected via a CAN data bus, and the control assembly is connected with said real-time assembly over a CAN data bus.

* * * * *